United States Patent
Kim et al.

(10) Patent No.: US 6,348,680 B2
(45) Date of Patent: Feb. 19, 2002

(54) FOOD AMOUNT DETECTOR OF A MICROWAVE OVEN, A MICROWAVE OVEN EMPLOYING A FOOD AMOUNT DETECTOR AND A CONTROL METHOD THEREOF

(75) Inventors: Chul Kim, Anyang; Tae-soo Park; Kwang-seok Kang, both of Suwon; Won-woo Lee, Ansan, all of (KR)

(73) Assignee: Samsung Electonics Co., Ltd., Suwon (KR)

(*) Notice: Subject to any disclaimer, the term of this patent is extended or adjusted under 35 U.S.C. 154(b) by 0 days.

(21) Appl. No.: 09/819,862

(22) Filed: Mar. 29, 2001

Related U.S. Application Data

(62) Division of application No. 09/226,214, filed on Jan. 7, 1999, now Pat. No. 6,215,112.

(30) Foreign Application Priority Data

| Mar. 24, 1998 | (KR) | .......................................... P98-10145 |
| Jul. 9, 1998 | (KR) | .......................................... P98-27690 |
| Nov. 5, 1998 | (KR) | .......................................... P98-47319 |
| Nov. 5, 1998 | (KR) | .......................................... P98-47320 |

(51) Int. Cl.$^7$ .............................................. H05B 6/68
(52) U.S. Cl. ........................ 219/704; 219/702; 219/708
(58) Field of Search ........................ 219/704, 702–703, 219/705, 708–709, 716; 315/224; 363/37; 324/644

(56) References Cited

U.S. PATENT DOCUMENTS

| 4,009,359 A | * | 2/1977 | Tallmadge et al. | .......... 219/705 |
| 4,317,977 A |   | 3/1982 | Buck |  |
| 4,447,693 A |   | 5/1984 | Buck |  |
| 4,673,800 A |   | 6/1987 | Hiri et al. |  |
| 4,900,989 A |   | 2/1990 | Suenaga et al. |  |
| 4,903,183 A |   | 2/1990 | Noguchi et al. |  |
| 5,283,410 A | * | 2/1994 | Kim | ............................ 219/704 |
| 5,506,390 A |   | 4/1996 | Seo |  |
| 6,268,597 B1 | * | 7/2001 | Shon et al. | .................. 219/709 |

FOREIGN PATENT DOCUMENTS

| EP | 0 526 297 | 2/1993 |
| GB | 2117925 | 10/1983 |
| JP | 63-271389 | 11/1988 |
| JP | 1-65794 | 3/1989 |
| JP | 3-238786 | 10/1991 |
| JP | 08-035666 | 10/1996 |

* cited by examiner

*Primary Examiner*—Teresa Walberg
*Assistant Examiner*—Quang Van
(74) *Attorney, Agent, or Firm*—Burns, Doane, Swecker & Mathis, L.L.P.

(57) ABSTRACT

A food amount detector for automatically detecting the amount of a food placed in a cooking chamber of a microwave oven, a microwave oven employing the food amount detector, and control method thereof. Output voltage of a microwave generator is detected while the microwave oven is driven, and the amount of the food placed in the cooking chamber of the microwave oven is determined based on the output voltage such detected. In accordance with the amount of the food such determined, the food is cooked under the appropriate driving conditions of the microwave oven. Accordingly, the user does not need to determine the amount of the food by himself, or set the driving conditions of the microwave oven such as cooking time, level of microwave energy, etc. As a result, the user finds it convenient when using this microwave oven, and the food is cooked under the exact driving conditions set by the microwave oven. Further, since the price of the parts are inexpensive, the manufacturing cost is reduced, and manufacturing process is simplified, so that productivity is improved.

5 Claims, 14 Drawing Sheets

FOOD AMOUNT DETECTOR OF A MICROWAVE OVEN, A MICROWAVE OVEN EMPLOYING A FOOD AMOUNT DETECTOR AND A CONTROL METHOD THEREOF

This application is a divisional of application Ser. No. 09/226,214, filed on Jan. 7, 1999, now U.S. Pat. No. 6,215,112.

BACKGROUND OF THE INVENTION

1. Field of the Invention

The present invention relates to a microwave oven, and more particularly to a food amount detector capable of automatically detecting the amount of food placed in the microwave oven, and to the microwave oven employing a food amount detector and a control method thereof.

2. Description of the Prior Art

Generally, a microwave oven heats/cooks the food by microwave. Such a microwave oven comprises a high voltage transformer and a magnetron. The high voltage transformer transforms common voltage (220V/110V) into high voltage for driving the magnetron which generates the microwave of a predetermined degree of high frequency. In such a situation, the microwave vibrates the water molecules in food, so that the food is cooked by friction heat produced due to the vibration of water molecules.

FIG. 1 is a partial cutaway perspective view of a general microwave oven. In FIG. 1, reference numeral 1 designates a body, 2 is a cooking chamber, 3 is a device chamber, 4 is a door, 5 is a rotational plate, and 6 designates a cover. The inner space of the body 1 is divided into a left and a right space in which a cooking chamber 2 and a device chamber 3 are respectively defined. Electric devices are installed in the device chamber 3. A cover 6 encases the body 1, thereby forming the appearance of the microwave oven. A door 4 is pivotally fixed to one side of the body 1, to open/close the front side of the cooking chamber 2. A rotational plate 5 is disposed at the bottom surface of the cooking chamber 2, and the food to be cooked is placed thereon. The rotational plate 5 is rotated by a driving motor (hereinafter referred to as DM; see FIG. 2) which is installed on the lower surface thereof. Additionally, reference numeral 7 designates a front panel, 8 is an air guide, 9 is a cooling fan, HVT is a High Voltage Transformer, HVC is a High Voltage Condenser, HVD is a High Voltage Diode, and MGT designates a Magnetron. Those are installed in the device chamber 3. The high voltage transformer HVT transforms the common voltage 220V/110V into high voltage 2000V. The high voltage 2000V is doubled to 4000V by the high voltage condenser HVC and the high voltage diode HVD. The magnetron MGT is driven by such doubled voltage 4000V to generate a microwave of 2450MHz. The cooling fan 9 blows air into the device chamber 3 to cool the heated electric devices installed therein such as the magnetron MGT, high voltage transformer HVT, or the like. The air guide 8 is installed near the magnetron MGT, to guide air which has been heated while the magnetron MGT is cooled, into the cooking chamber 2. The front panel 7 is installed at the front surface of the device chamber 3. The user inputs the data of his selected keys into the microwave oven, and his selections for driving the microwave oven are displayed on the front panel 7.

FIG. 2 is a schematic block diagram of FIG. 1. In FIG. 2, reference numeral 10 designates a noise filter, 20 is a driving section, 30 is a microwave generator, 40 is a control section, 50 is a input section, and 60 designates a display section. An input section 50 inputs the signals of the user's selections into a control section 40. A plurality of function keys 51 are provided in the input section 50. Here, the function keys are for respective driving conditions of the microwave oven. More specifically, there could be the function keys for adjusting cooking temperature, cooking time, level of the microwave energy, or the like as the user wishes. In addition, there could be the function keys for selecting the automatic cooking process, in which the user inputs the data about the amount of the food so that the food is automatically cooked in accordance with the cooking data which were preset therefor. The display section 60 displays the driving conditions of the microwave oven. Here, the input section 50 and the display section 60 are preferably provided at the front panel 7 shown in FIG. 1. The driving section 20 comprises driving motors DM and FM for respectively driving the rotational plate 5 and the cooling fan 9. Further, the driving section 20 comprises relay switches RS1 and RS2, respectively for supplying the driving power to the high voltage transformer HVT and the driving motors DM and FM. Accordingly, when the relay switches RS1 and RS2 of the driving section 20 are turned on, the driving power is supplied to the high voltage transformer HVT and the driving motors DM and FM. A general microcomputer would serve as the control section 40. The control section 40 properly controls the driving conditions of the microwave oven by selectively turning on/off the relay switches RS1 and RS2 of the driving section 20. The control section 40 also sends the signals to the display section 60 and displays such driving conditions of the microwave oven. The high voltage transformer HVT transforms the common voltage supplied from the driving section 20 into high voltage, and transmits the high voltage to the microwave generator 30. The microwave generator 30 comprises the high voltage condenser HVC, the high voltage diode HVD, and the magnetron MGT. The microwave generator 30 is driven by high voltage supplied from the high voltage transformer HVT, just as it was described above with respect to FIG. 1. The noise filter 10 receives the driving power, and transmits the driving power to the driving section 20. Further, the noise filter 10 prevents feed back of high frequency wave generated from the microwave generator 30 toward an input line.

Operation of the conventional microwave oven constructed as above will be described below. First, the user pulls the door 4 of the body 1 and opens the cooling chamber 2. Then, the user places the food to be cooked on the upper surface of the rotational plate 5. Next, the user closes the door 4, and selects cooking conditions of microwave oven by selecting function keys 51 of the input section 50 which is provided at the front panel 7. By selecting the function keys 51, the user sets the cooking time, temperature, and level of the microwave energy as he guesses proper for the amount of the food placed in the microwave oven. In addition to such a manually-selected driving condition, there may be an automatically-selected driving condition in which the user simply selects keys provided for the food he/she is preparing and the amount thereof, so that the food is cooked in a manner which was preset in the microwave oven. Accordingly, the input section 50 inputs the signals from the selected keys to the control section 40, and the control section 40 drives the driving section 20 in accordance with the user's selections. More specifically, the control section 40 turns on the relay switch RS1 so that the power is supplied to the high voltage transformer HVT. Accordingly, the high voltage transformer HVT transforms the common voltage 220V/110V into high voltage. And the high voltage condenser HVC and the high voltage diode HVD double the high voltage to 4000V, and supply the same to the magnetron MGT. The magnetron MGT is driven by such doubled high voltage 4000V to generate the microwave of 2450 MHz. Then microwave is radiated into the cooking chamber 2 so that the food is cooked. Further, the control section 40 simultaneously turns on the relay switches RS1 and RS2 so that the control section 40 drives the driving motors DM and FM, respectively. Accordingly, the rotational plate 5 of the cooking chamber 2 is rotated so that the microwave is uniformly radiated to the food. In this situation, the cooling fan 9 of the device chamber 3 blows air into the device chamber 9, to cool the electric devices such as the high voltage transformer HVT, the magnetron MGT, the high voltage diode HVD, and the high voltage condenser HVC, etc. Here, the control section 40 turns on/off the relay switch RS1 regularly, to control the driving conditions of the magnetron MGT. Accordingly, the level of the microwave generated from the magnetron MGT are properly adjusted, so that the food in the cooking chamber 2 is appropriately cooked under the selected driving conditions.

Meanwhile, in addition to the manually-selected driving conditions, the conventional microwave oven further has an automatically-selected driving condition. With such an automatically-selected driving condition, however, the amount of the food can not be determined by the microwave oven. Accordingly, the user has to guess the best cooking mode for the food, and based on his/her guess, one selects corresponding function keys, and the microwave oven cooks the food in accordance with-such inputted data. Here, when the food requires more time or greater level of microwave energy for cooking than the user inputted, the food is under-cooked. Likewise, when the food requires less time, or less level of microwave energy for cooking than the user inputted, the food is overcooked. Accordingly, in order to cook the food appropriately, it is important that the user may judge the exact amount of the food and drive the microwave oven accordingly.

The conventional microwave oven, however, can not offer the solution to the above-mentioned problem, since the user has to guess the amount of the food. Further, in the event that there is no function keys for the amount of the food the user wishes to cook, the user has to manually input the data for cooking time, level of microwave energy, etc., so that the preparation of the food becomes inconvenient and complex.

Further, when using a conventional microwave oven, since the user has to guess the amount of the food he/she is preparing, the preciseness of the food amount is not guaranteed, so that the cooking operation may be inappropriately performed. If the user selects an improper function key by his/her mistake or misjudgement, the food can be overcooked, or under-cooked. Thus, the food can not be appropriately cooked.

There has been a solution suggested for the above-mentioned problem such as a gas sensor, a weight sensor, etc. which could be employed in a microwave oven to determine the amount of the food. However, since these devices are expensive and require a rather complex manufacturing process, the manufacturing cost is increased, and the efficiency is accordingly deteriorated.

SUMMARY OF THE INVENTION

Accordingly, the present invention has been made to overcome the above-mentioned problem of the prior art, and the first object of the present invention is to provide a food amount detector for a microwave oven capable of automatically determining the amount of the food, and microwave oven employing such a food amount detector and control method thereof.

The second object of the present invention is to provide a food amount detector capable of setting exact data for driving conditions of the microwave oven in accordance with the amount of the food and appropriately cooking the food, and also to provide the microwave oven employing such a food amount detector and control method thereof.

The third object of the present invention is to provide a food amount detector made of parts having reasonable prices so that the manufacturing cost can be minimized and the efficiency can be improved, and also to provide a microwave employing such a food amount detector and control method thereof.

The first feature of the food amount detector according to the present invention is that output voltage of the microwave generator is detected, so that the amount of the food placed in a cooking chamber of the microwave oven is determined based on such detected output voltage of the microwave generator.

The second feature of the food amount detector according to the present invention is that it comprises a voltage detector for detecting output voltage of a magnetron, and a control means for determining the amount of the food placed in the cooking chamber of the microwave oven based on the output voltage of the magnetron which is detected by the voltage detector. The voltage detector comprises at least one voltage dividing resistor connected to a cathode of the magnetron to divide the output voltage of the magnetron, so as to detect the voltage divided at a predetermined ratio by the voltage dividing resistor and then outputted. The current is converted into the plus (+) current while the bias voltage is applied to one side of the voltage dividing resistor, and the voltage detector inputs such converted plus (+) current to the control means. The current is converted into the plus (+) current while a reversion amplifier is connected to one side of the voltage dividing resistor, and the voltage detector inputs such converted plus (+) current to the control means. The control means comprises a comparison/determination part for determining the amount of the food by receiving the output voltage of the magnetron, which is detected by the voltage detector for a predetermined time, and by comparing voltage variation per predetermined time unit with a reference voltage variation which was pre-inputted.

The third feature of the food amount detector of a microwave oven according to the present invention is that it comprises a voltage detector for detecting respective output voltages of a magnetron and a high voltage transformer, and a control means for determining the amount of a food placed in a cooking chamber of a microwave oven based on the respective output voltages detected by the voltage detector. The voltage detector comprises at least one voltage dividing resistor connected to a cathode of the magnetron to divide the output voltage of the magnetron, and a step-down resistor connected to a ground of the high voltage transformer, so as to detect the voltages Vb and Va, respectively, in which the voltage Vb is that which is divided at a predetermined ratio by the voltage dividing resistor and then outputted, and the voltage Va is that which is outputted from the voltage dividing resistor. The current is converted into the plus (+) current, while the bias current is applied to one side of the voltage dividing resistor, and the voltage detector inputs such converted plus (+) current to the control means. The current is converted into the plus (+) current, while a reversion amplifier is connected to one side of the voltage dividing resistor, and the voltage detector inputs such converted plus (+) current to the control means. The control means comprises a calculation part for receiving a plurality of output voltages detected by the voltage detector, and for calculating an impedance and a cutoff voltage through the output voltages, and a comparison/determination part for determining the amount of the food by comparing values of impedance and the cutoff voltage obtained by the calculation part with data about the impedance and the cutoff voltage which are pre-inputted.

The first feature of a microwave oven according to the present invention is that the microwave oven comprises a voltage detector for detecting output voltage of a magnetron, a control means for determining the amount of the food placed in a cooking chamber of the microwave oven based on the output voltage of the magnetron which is detected by the voltage detector, and a driving means for driving the mgnetron in accordance with the amount of the food which is determined by the control means, and for cooking the food under the appropriate conditions. The voltage detector comprises at least one voltage dividing resistor connected to a cathode of the magnetron to divide the output voltage of the magnetron, so as to detect the voltage which is divided at a predetermined ratio by the voltage dividing resistor and then outputted. The control means comprises a comparison/determination part for determining the amount of the food by receiving the output voltage of the magnetron, which is detected by the voltage detector for a predetermined time, and by comparing the voltage variations per predetermined time unit with the reference voltage variation which is pre-inputted, and a driving control part for controlling the driving means in accordance with the amount of the food which is determined by the comparison/determination part.

The second feature of the microwave oven is that the microwave oven comprises a control means for determining a amount of a food placed in a cooking chamber of a microwave oven based on output voltage of the magnetron which is detected by the voltage detector, and a display means for displaying the data about the amount of the food which are determined by the control means. The control means comprises a comparison/determination part for determining the amount of the food by receiving the output voltage of the magnetron, which is detected by the voltage detector for a predetermined time, and by comparing the voltage variations per predetermined time unit with the reference voltage variation which is pre-inputted, and a display control part for controlling the display means in accordance with the amount of the food which is determined by the comparison/determination part.

The third feature of the microwave oven according to the present invention is that the microwave oven comprises a voltage detector for detecting output voltage of a magnetron, a control means for determining the amount of a food placed in a cooking chamber of a microwave oven based on output voltage of the magnetron detected by the voltage detector, a driving means for properly cooking food by driving the magnetron in accordance with the amount of the food which is determined by the control means, and a display means for displaying the data about the amount of the food which is determined by the control means.

The fourth feature of the microwave oven according to the present invention is that the microwave oven comprises a voltage detector for detecting respective output voltages of a magnetron and a high voltage transformer, a control means for determining the amount of a food placed in a cooking chamber of a microwave oven based on a plurality of output voltages of the microwave generator which are detected by the voltage detector, and a driving means for properly cooking food by driving the microwave generator in accordance with the amount of the food which is determined by the control means. The voltage detector comprises at least one voltage dividing resistor connected to a cathode of the magnetron to divide output voltage of the magnetron, and a step-down resistor connected to a ground of the high voltage transformer, so as to detect output voltages Vb and Va, respectively, in which the output voltage Vb is that which is divided at a predetermined ratio by the voltage dividing resistor and then outputted, and the output voltage Va is that which is outputted from the step-down resistor. The control means comprises a calculation part for receiving a plurality of output voltages detected by the voltage detector, and for calculating an impedance and a cutoff voltage of the microwave generator, a comparison/determination part for determining the amount of a food by comparing values of impedance and the cutoff voltage obtained by the calculation part with data about the impedance and the cutoff voltage which are pre-inputted, and a driving control part for controlling the driving means in accordance with the amount of the food which is determined by the comparison/determination part.

The fifth feature of the microwave oven according to the present invention is that the microwave oven comprises a voltage detector for detecting respective output voltages of a magnetron and a high voltage transformer, a control means for determining the amount of a food placed in a cooking chamber of a microwave oven based on a plurality of output voltages of the microwave generator which are detected by the voltage detector, and a display means for displaying the data about the amount of the food which are determined by the control means. The control means comprises a calculation part for receiving a plurality of output voltages detected by the voltage detector, and for calculating an impedance and a cutoff voltage of the microwave generator, a comparison/determination part for determining the amount of a food by comparing values of impedance and the cutoff voltage which are obtained by the calculation part with data about the impedance and the cutoff voltage which are pre-inputted, and a display control part for controlling the display means in accordance with the amount of the food which is determined by the comparison/determination part.

The sixth distinguishing feature of the microwave oven according to the present invention is that the microwave oven comprises a voltage detector for detecting respective output voltages of a magnetron and a high voltage transformer, a control means for determining the amount of a food placed in a cooking chamber of a microwave oven based on a plurality of output voltages of the microwave generator which are detected by the voltage detector, a driving means for properly cooking food by driving the microwave generator in accordance with the amount of the food which is determined by the control means, and a display means for displaying the data about the amount of the food which are determined by the control means.

The feature of a method for controlling a microwave oven according to the present invention is that the control method comprises steps of detecting output voltage of a magnetron, determining the amount of a food placed in a cooking chamber of a microwave oven based on an output voltage of the magnetron which is detected in the voltage detecting step, and cooking food properly by driving the magnetron in accordance with the amount of the food which is determined in the food amount determination step. The amount of the food is determined in the food amount determination step by receiving the output voltage of the magnetron detected in the output voltage detection step for a predetermined time, and comparing the voltage variation per predetermined time unit with reference voltage variation which is pre-inputted. The food amount determination step comprises sub-steps of inputting output voltage variation per predetermined time unit detected in the voltage detection step to a Neural Net Program after the voltage variation is converted into patterned values having a predetermined law therein, outputting results from the Neural Net Program after calculating equations of the Neural Net Program referring to pre-inputted patterned values and pre-learned data, and determining the amount of a food placed in a cooking chamber of a microwave oven based on the output result. The amount of a food is determined in the food amount determination step by receiving a plurality of output voltages which are detected in the voltage detection step, calculating values of impedance and cutoff voltage with the output voltages, and by comparing the values of impedance and cutoff voltage with data of the impedance and the cutoff voltage which are pre-inputted. The food amount determination step further comprises a sub-step of displaying the data about the amount of a food which are determined in the food amount determination step.

Accordingly, since the amount of the food is automatically determined by the microwave oven, and the food is cooked under the appropriate driving conditions of the microwave oven, the user finds it convenient in using the microwave oven, and mistakes of the user in handling the microwave oven are prevented. Also, since the parts are inexpensive, the manufacturing cost is reduced, and the manufacturing process becomes simplified, so that the productivity is increased.

BRIEF DESCRIPTION OF THE DRAWINGS

The above object and advantages will be more apparent by describing the preferred embodiment in greater detail with reference to the accompanied drawings, in which.

DETAILED DESCRIPTION OF THE PREFERRED EMBODIMENT

Figure 1:
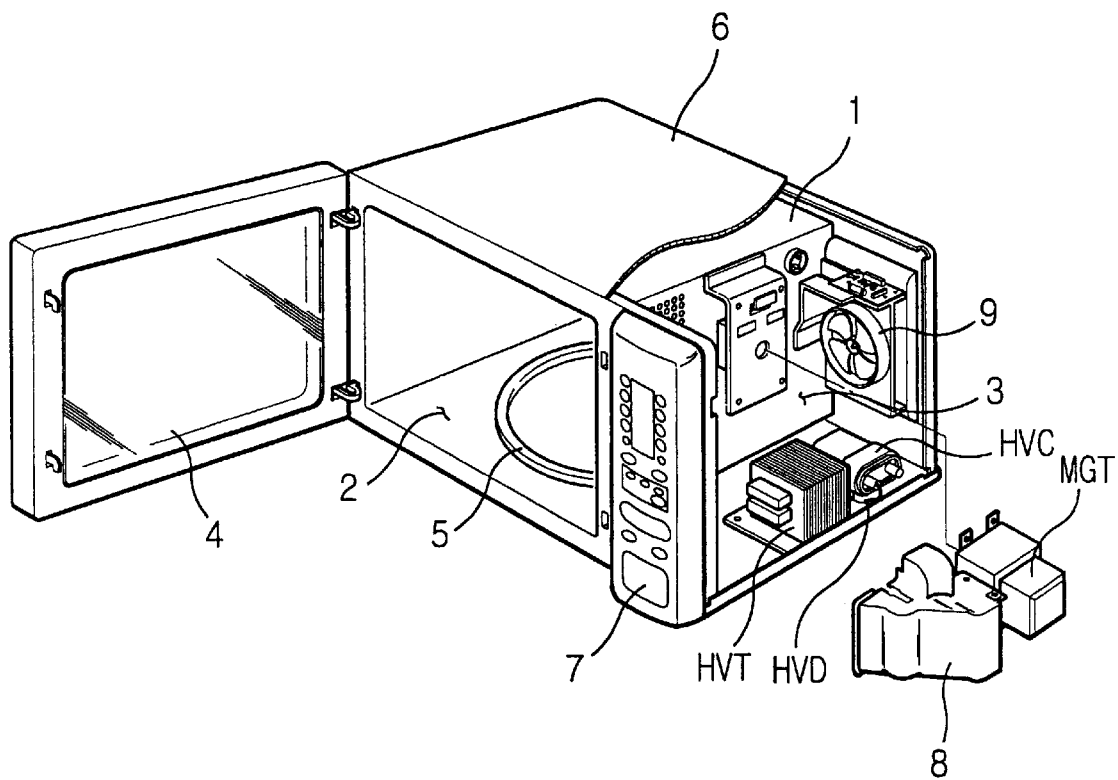
FIG. 1 is a partial cutaway perspective view of a conventional microwave oven.
Figure 2:
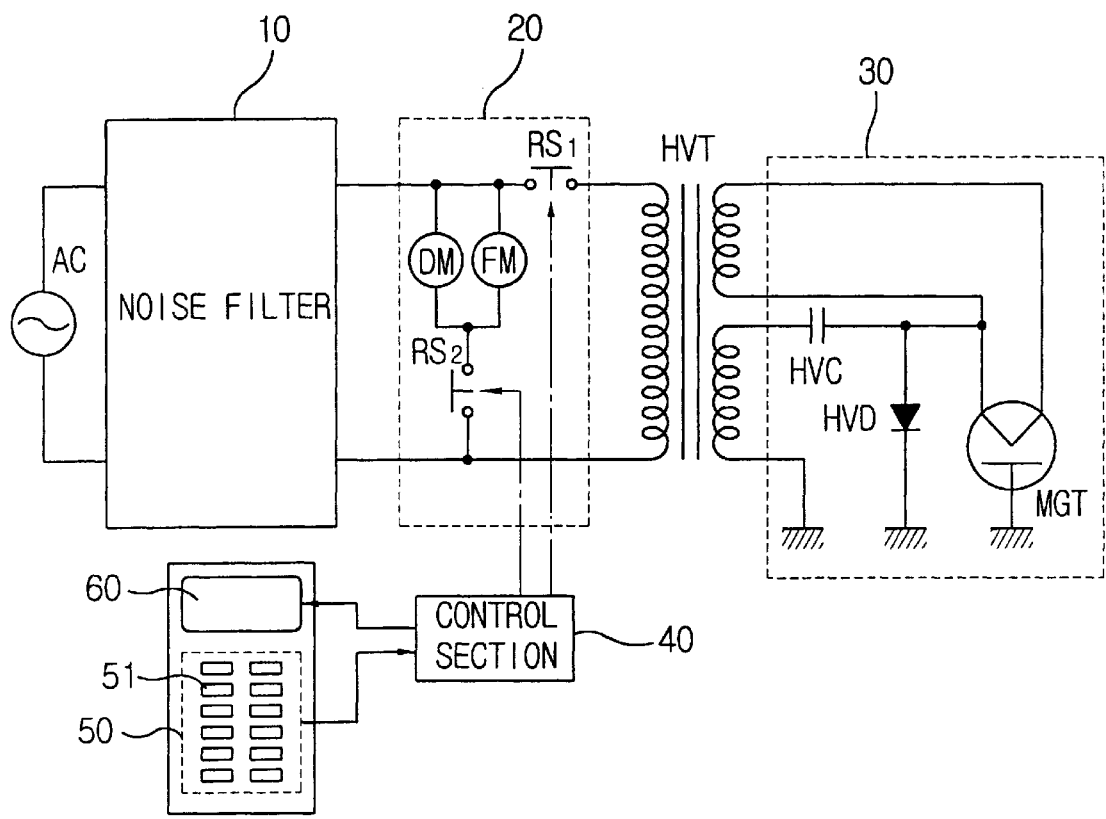
FIG. 2 is a schematic block diagram of FIG. 1.
Figure 3:
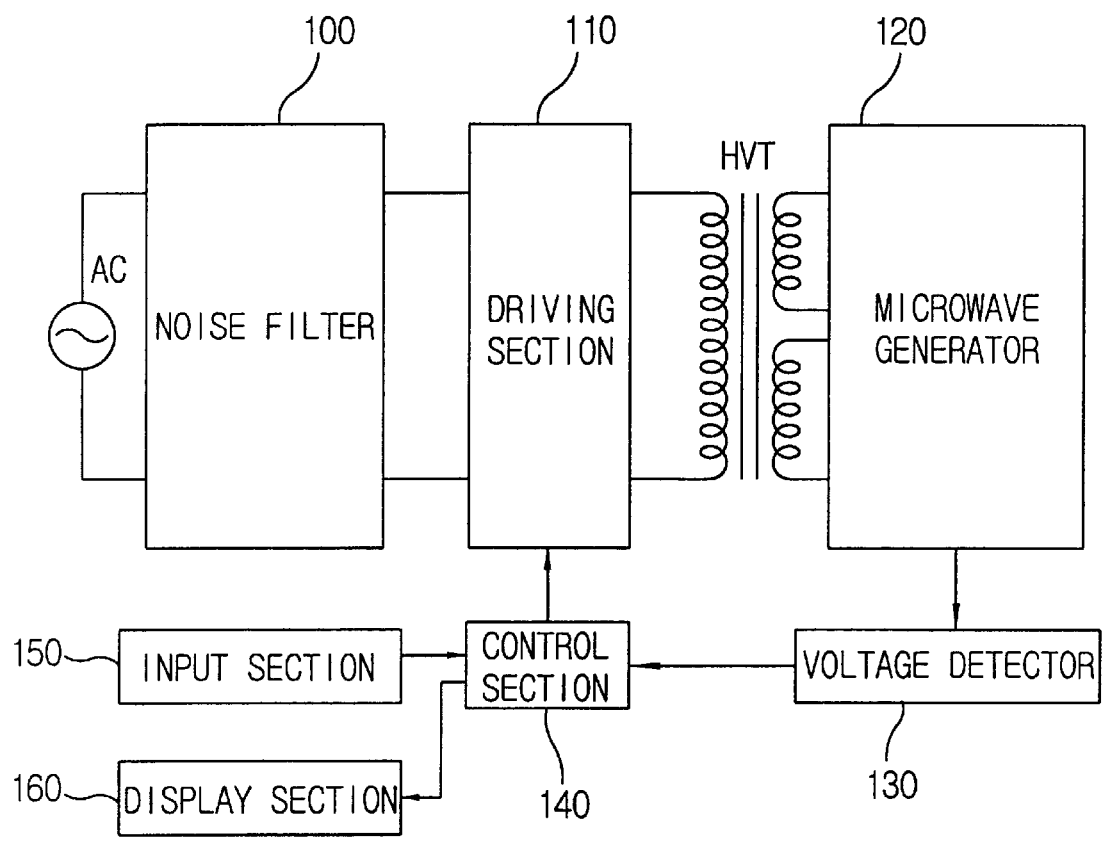
FIG. 3 is a block diagram for showing the microwave oven employing a food amount detector according to the preferred embodiment of the present invention.
Figure 4:
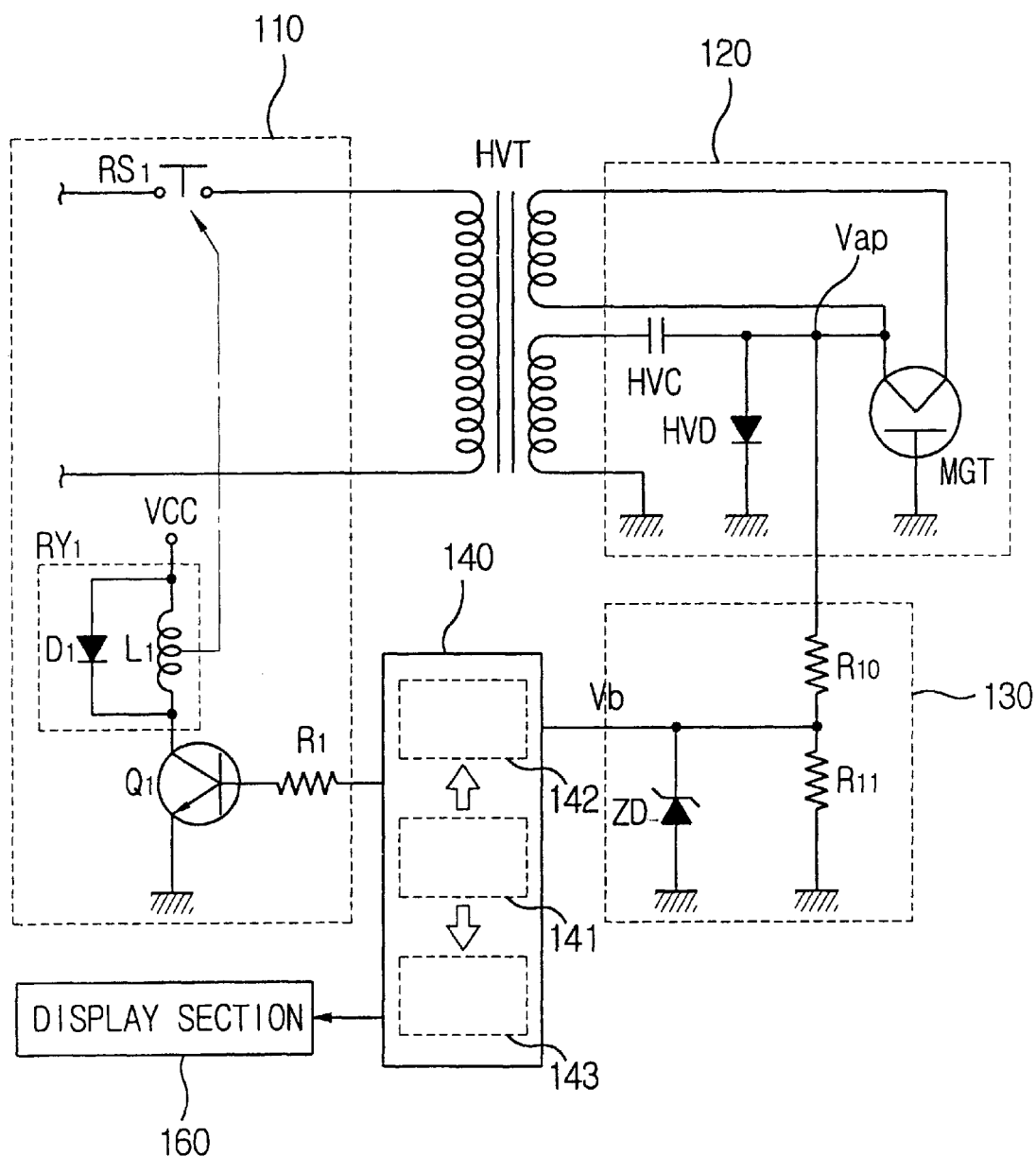
FIG. 4 is a circuit diagram for showing a main section of FIG. 3.

FIG. 3 is a block diagram for showing the microwave oven employing the food amount detector according to the preferred embodiment of the present invention, and FIG. 4 is a circuit diagram for showing the main section of FIG. 3. In FIG. 3, reference numeral 100 is a noise filter, 110 is a driving section, 120 is a microwave generator, 130 is a voltage detector, 140 is a control section, 150 is an input section, and 160 designates a display section. A driving section 110 supplies the driving power to a high voltage transformer HVT. The high voltage transformer HVT transforms the supplied voltage 220V/110V into high voltage (approx. 2000V), and transmits the high voltage to a microwave generator 120. The microwave generator 120 is driven by high voltage supplied from the high voltage transformer HVT to generate the microwave of a predetermined frequency. A voltage detector 130 detects the voltage which is varying when the microwave generator 120 is driven. A microcomputer preferably serves as the control section 140. The control section 140 determines the amount of the food in a cooking chamber 2 by the inputted voltage of the microwave generator 120 which was detected by the voltage detector 130. Based on the amount of the food such detected as above, the control section 140 controls the driving conditions of the driving section 110, so that the microwave oven is driven in accordance with the proper cooking time, level of microwave, etc. The input section 150 inputs the data from the-function keys which were selected by the user to the control section 140, and the display section 160 inputs the display signals from the control section 140 so as to display the driving conditions of the microwave oven. The noise filter 100 receives the AC and applies the AC to the driving section 110 after eliminating the noise factor of the AC. The noise filter 100 also prevents the feed back of high-frequency wave which is generated from the microwave generator 120.

In FIG. 4, the driving section 110 comprises a relay RY1 for supplying the driving power to the high voltage transformer HVT. The relay RY1 comprises a relay coil L1 and a relay switch RS1. The current selectively flows through the relay coil L1 by the switching movement of a transistor Q1, and the relay switch RS1 is turned on/off by the relay coil L1. Further, in FIG. 4, reference symbol R1 designates a resistor, and D1 designates a diode for preventing reversion of voltage. The microwave generator 120 comprises the high voltage condenser HVC, the high voltage diode VHD, and the magnetron MGT. The high voltage condenser HVC and the high voltage diode HVD double the high voltage 2000V, which was transformed by the high voltage transformer HVT, into 4000V. The magnetron MGT is driven by such doubled high voltage 4000V and generates the microwave of 2450 MHz. For this purpose, the voltage detector 130 comprises at least one voltage dividing resistors R10 and R11 connected to a cathode of the magnetron MGT. The ratio of values of the voltage dividing resistors R10 and R11 is 1000:1, approximately. It is preferable that the voltage Vb is divided at a predetermined ratio and outputted. Reference symbol ZD in the figures designates the Zener diode. The control section 140 comprises a comparison/determination part 141, a driving control part 142, and a display control part 143. A comparison/determination part 141 receives the output voltage Vap of the microwave generator 130 which has been detected by the voltage detector 120, and then determines the amount of the food by comparing the values of voltage variation per predetermined time unit with the reference voltage variation (see FIG. 7). The driving control part 142 controls the driving section 110 based on the amount of the food which was determined by the comparison/determination part 141. The display control part 143 controls the display section 160 based on the amount of the food which was determined by the comparison/determination part 141.

Figure 5:
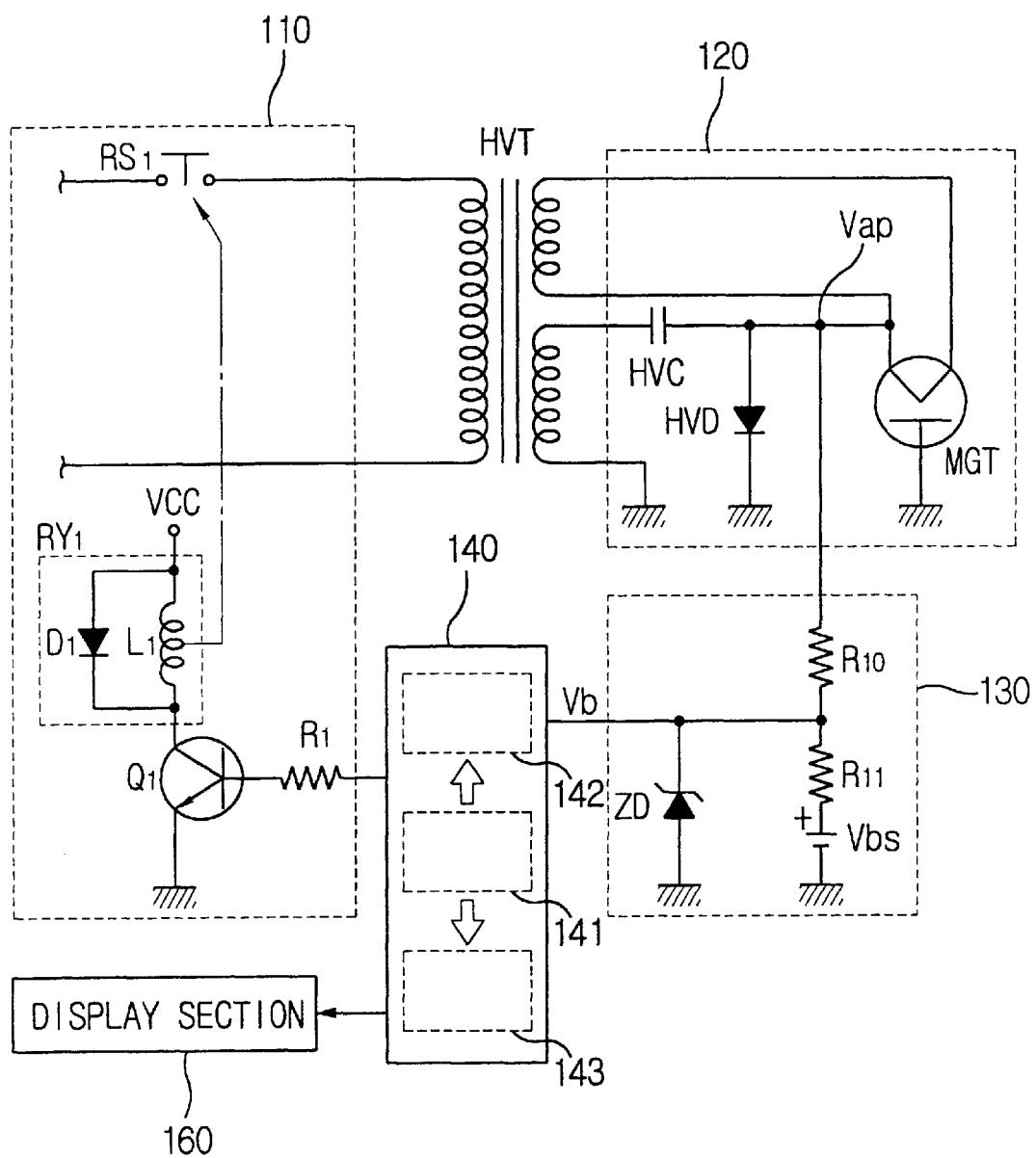
FIG. 5 is a circuit diagram of FIG. 4 which is applied with bias voltage.

FIG. 5 is a circuit diagram of FIG. 4 which is applied with bias voltage. In FIG. 5, detailed construction of the driving section 110, the high voltage transformer HVT, the microwave generator 120, and the control section 140 are as described earlier with reference to FIG. 4. The unique feature shown in FIG. 5 is that the voltage detector 130 inputs the plus (+) current to the control section 140 by applying the bias voltage to an end of the voltage dividing resistor R11. Since the signals are processed by the plus (+) current in the control section 140 employing the microcomputer, the signals are conveniently processed when the plus (+) current is inputted to the control section 140.

Figure 6:
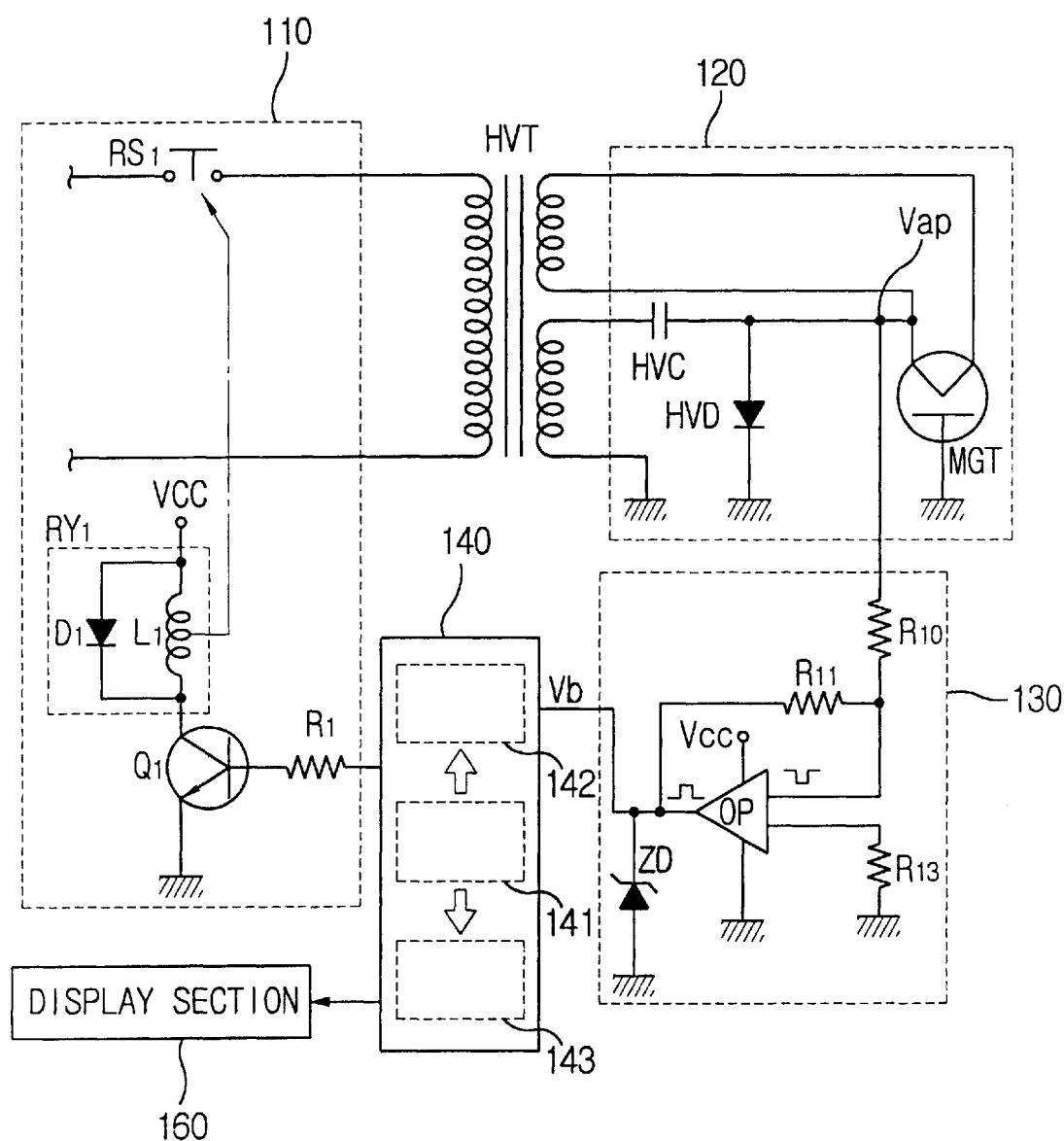
FIG. 6 is a circuit diagram of FIG. 4 employed with an inversion amplifier.

FIG. 6 is a circuit diagram of FIG. 4 employed with an inversion amplifier. In FIG. 6, detailed constructions of the driving section 110, the high voltage transformer HVT, the microwave generator 120, and the control section 140 are identical with those described earlier with reference to FIG. 4. The unique feature shown in FIG. 6 is that the voltage detector 130 connects the inversion amplifier OP at the end of the voltage dividing resistor R10 so as to input the plus (+) current of the inverted phase to the control section 140. Unidentified reference symbol R13 refers to the resistor.

Figure 7:
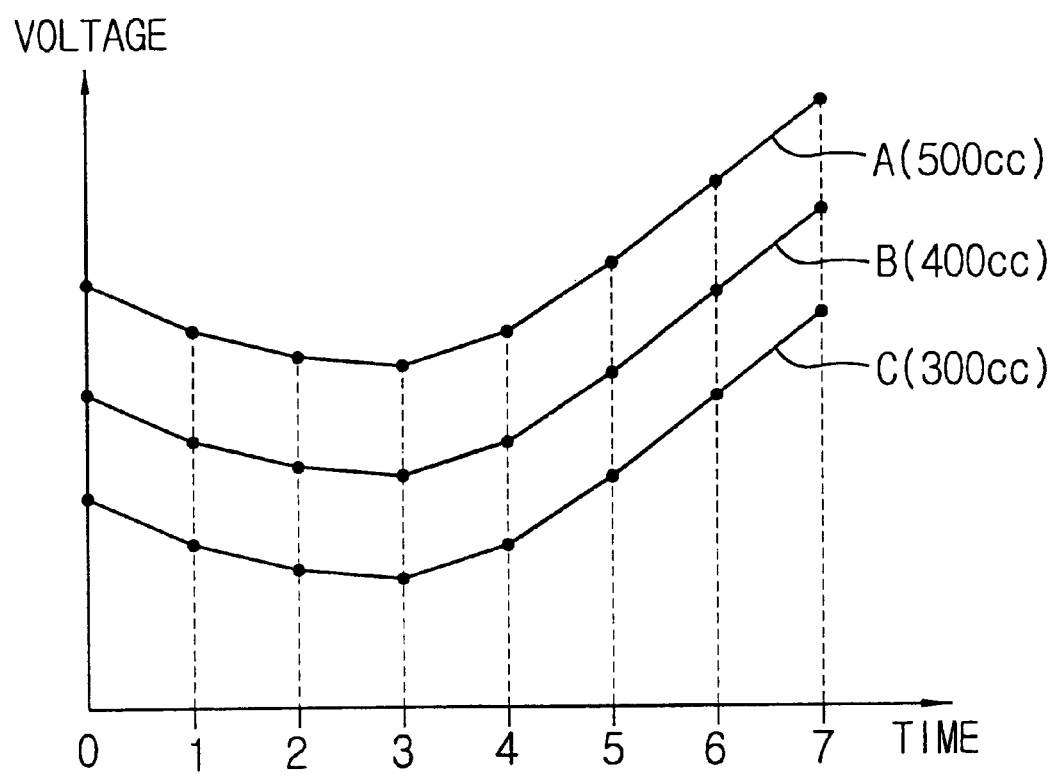
FIG. 7 is a graph for showing output voltage of the magnetron per predetermined time unit which varies in accordance with the amount of the food.

FIG. 7 is a graph for showing output voltage of the magnetron varying on the basis of predetermined time unit and the amount of the food, in which the output voltage variations per predetermined time unit are shown in lines corresponding to the respective amounts of the food. Here, the output voltage variations per predetermined time unit are obtained through the output voltage Vap of the microwave generator 120 which is measured for a predetermined time.

Operation of the microwave oven according to the preferred embodiment of the present invention will be described below in greater detail with respect to FIGS. 3 to 7.

First, the user places the food to be cooked in the cooking chamber 2, closes the door, and pushes the start key (not shown) of the input section 150 without setting the amount of the food. Thus, the microwave oven is driven. Here, the signal from the start key is inputted to the control section 140 by the input section 150, and the control section 140 drives the driving section 110 in accordance with the signal it has received. Accordingly, the control section 140 applies the base current to the transistor Q1 of the driving section 110, so that the transistor Q1 is turned on. Consequently, the current flows through the relay coil L1, and the relay coil L1 turns on the relay switch RS1. Then, the driving power is supplied to the high voltage transformer HVT where the driving power is transformed into high voltage 2000V and transmitted to the microwave generator 120. The high voltage condenser HVC and the high voltage diode HVD of the microwave generator 120 double the high voltage 2000V which was transformed by the high voltage transformer HVT to 4000V. The magnetron MGT is driven by such doubled voltage 4000V, to generate the microwave of 2,450 MHz. In such a situation, the output voltage Vap of the cathode of the magnetron is inputted to the voltage dividing resistors R10 and R11 of the voltage detector 130, and then divided at the respective resistance ratios. Such divided voltage Vb is transmitted to the control section 140. Here, it is preferable that the value of resistance ratio of the voltage dividing resistors R10 and R11 is 1000:1, approximately. Accordingly, when the voltage output approximately of 4000V is generated at the cathode of the magnetron MGT, the voltage approximately of 4V is inputted to the control section 140. Meanwhile, since the voltage output Vap of the cathode of the magnetron MGT is detected as the minus (−) current, the plus (+) current should be inputted to the control section 140 to make easier processing of the control section 140 by applying the bias current Vbs to the side of the voltage dividing resistor R11 as shown in FIG. 5, or by connecting the reversion amplifier OP to the side of the voltage dividing resistor R10 as shown in FIG. 6. The comparison/determination part 141 of the control section 140 inputs the output voltage Vap of the microwave generator 120-which was detected as above- for a predetermined time, and compares voltage variations per predetermined time unit with the reference voltage variation to determine the amount of the food. More specifically, when the detected voltage variation is shown in the line A of FIG. 7, it is determined that the amount of the food is 500 cc. When the detected voltage variation is shown in the line B of FIG. 7, it is determined that the amount of the food is 400 cc, and when the detected voltage variation is shown in the line C of FIG. 7, it is determined that the amount of the food is 300 cc. When the amount of the food is determined, the driving control part 142 controls the driving section 110 in accordance with the amount of the food, which was determined by the comparison/determination part 141. More specifically, the driving control part 142 selectively turns on/off the relay RY1 of the driving section 110 for a predetermined time in accordance with the amount of the food, so that the driving control part 142 controls the magnetron MGT. As a result, the food is cooked under the appropriate driving conditions. Further, the display control part 143 controls the display section 160 in accordance with the amount of the food, so that the data about the amount of the food are displayed on the display section 160. Accordingly, the amount of the food is automatically determined by the microwave oven, and the food is cooked under the appropriate conditions. As a result, the microwave oven becomes easier to handle, and mistakes of the user in handling the microwave oven are prevented. Further, with the parts of reasonable prices, the manufacturing cost is reduced, and the manufacturing process is simplified, so that productivity is increased.

Figure 8:
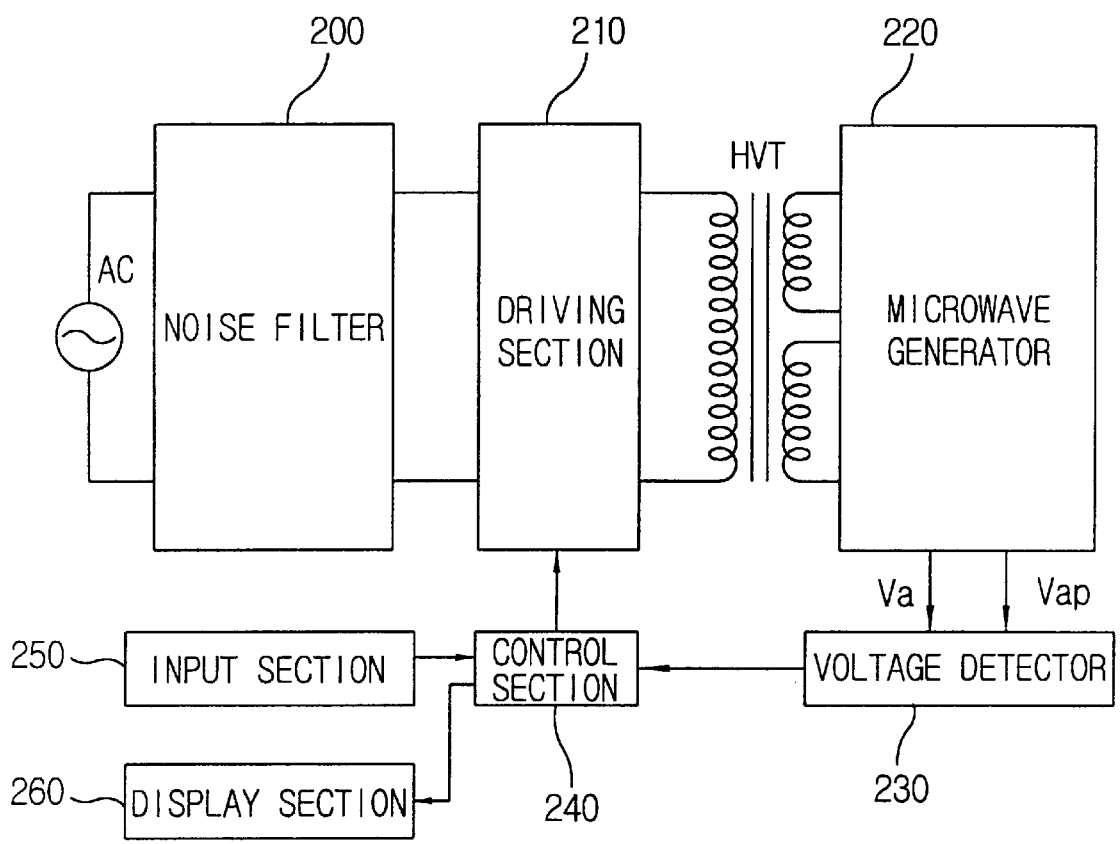
FIG. 8 is a block diagram of the microwave oven employing the food amount detector according to another preferred embodiment of the present invention.
Figure 9:
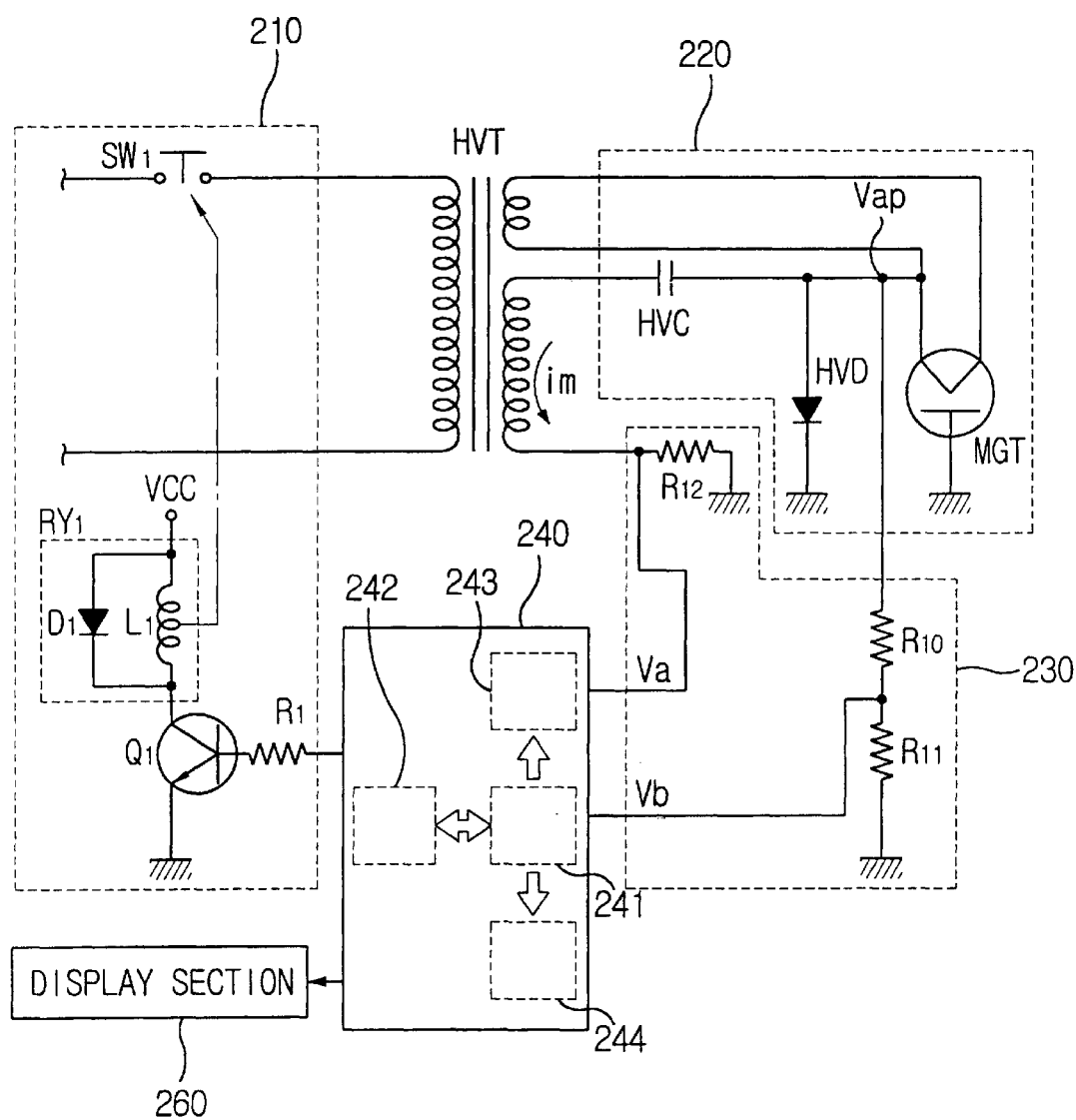
FIG. 9 is a circuit diagram of FIG. 8.

FIG. 8 is a block diagram of the microwave oven employing the food amount detector according to another preferred embodiment of the present invention, and FIG. 9 is a circuit diagram of FIG. 8. In FIG. 8, reference numeral 200 designates a noise filter, 210 is a driving section, 220 is a microwave generator, 250 is an input section, and 260 is a display section. Construction and operation of these are identical with those which were described earlier with respect to FIG. 4. The unique feature of another preferred embodiment of the present invention is that the voltage detector 230 detects a plurality of output voltages Va and Vap of the microwave generator 220, and that the control section 240 determines the amount of the food based on the output voltages Va and Vap of the microwave generator 220 which were detected by the voltage detector 230.

Refer to FIG. 9, the voltage detector 230 detects the output voltage Vap of the magnetron MGT and the voltage Va of the high voltage transformer, respectively. For that purpose, the voltage detector 230 comprises at least one voltage dividing resistors R10 and R11 connected to the cathode of the magnetron MGT, and a step-down voltage resistor R12 connected to a ground of the high voltage transformer HVT. Preferably, the ratio of values of the resistors R10 and R11 is 1000:1, approximately. Accordingly, the voltage Vb which is divided at such resistance ratio is inputted to the control section 240. The control section 240 comprises the comparison/determination part 241, a calculation part 242, the driving control part 243, and the display control part 244. The calculation part 242 receives a plurality of output voltages Vb and Va from the voltage detector 230, and calculates an impedance Rm and a cutoff voltage Ez of the microwave generator 220. The comparison/determination part 241 compares the impedance Rm and the cutoff voltage Ez calculated by the calculation part 242 with data about the impedance Rm and the cutoff voltage Ez which were pre-inputted thereto (see FIG. 11), and determines the amount of the food through the comparison result. The driving control part 243 controls the driving section 210 based on the amount of the food, which was determined by the comparison/determination part 241. The display control part 244 controls the display section 260 based on the amount of the food which was determined by the comparison/determination part 241.

Figure 10:
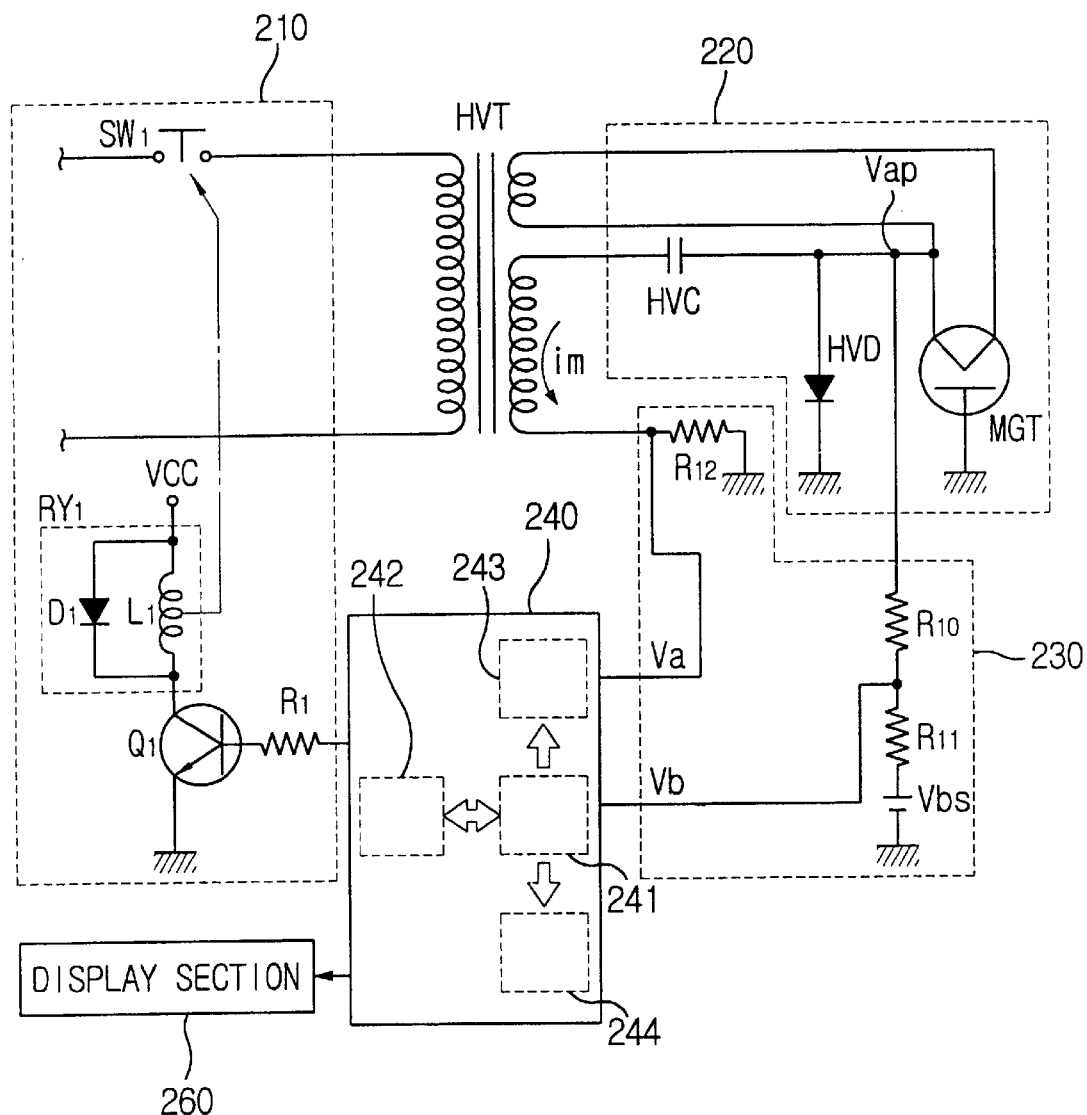
FIG. 10 is a circuit diagram of FIG. 9 which is applied with the bias voltage.

FIG. 10 is a circuit diagram of FIG. 9 which is applied with the bias voltage. Refer to FIG. 10, the detailed construction of the driving section 210, the high voltage transformer HVT, the microwave generator 220, and the control section 240 are identical to those described earlier with respect to FIG. 9. The unique feature shown in FIG. 10 is that the voltage detector 230 applies the bias current Vbs to the side of the voltage dividing resistor R11, to input the plus (+) current to the control section 140.

Figure 11:
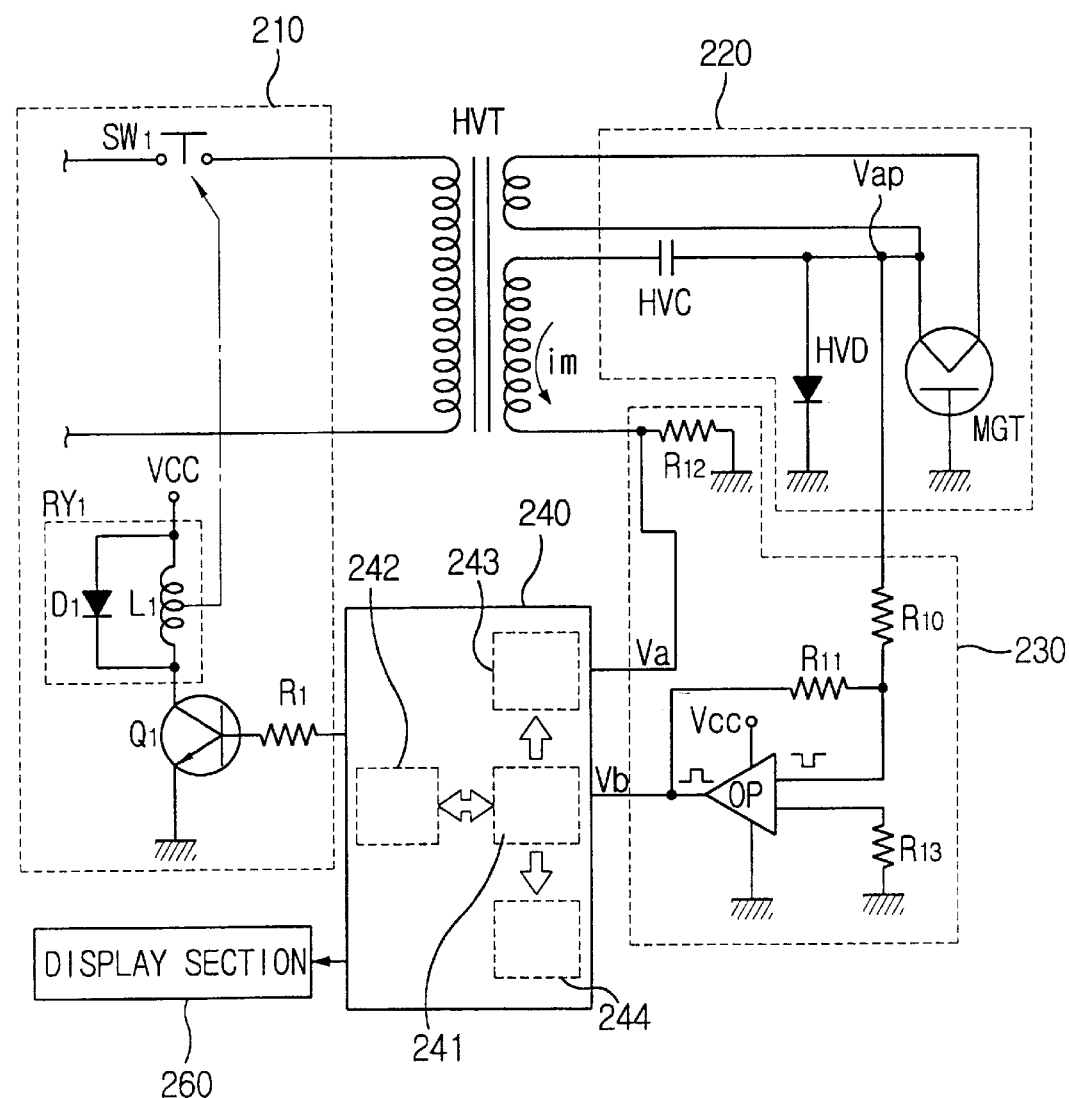
FIG. 11 is a circuit diagram of FIG. 9 which employs the inversion amplifier.

Further, FIG. 11 is a circuit diagram of FIG. 9 which employs the reversion amplifier. Refer to FIG. 11, the detailed construction of the driving section 210, the high voltage transformer HVT, the microwave generator 220, and the control section 240 are identical to those described earlier with respect to FIG. 9. The unique feature shown in FIG. 11 is that the reversion amplifier OP is connected to the side of the voltage dividing resistor R10, so that the voltage detector 230 inputs the plus (+) current to the control section 140. Unidentified reference numeral R13 is a resistor.

Figure 12:
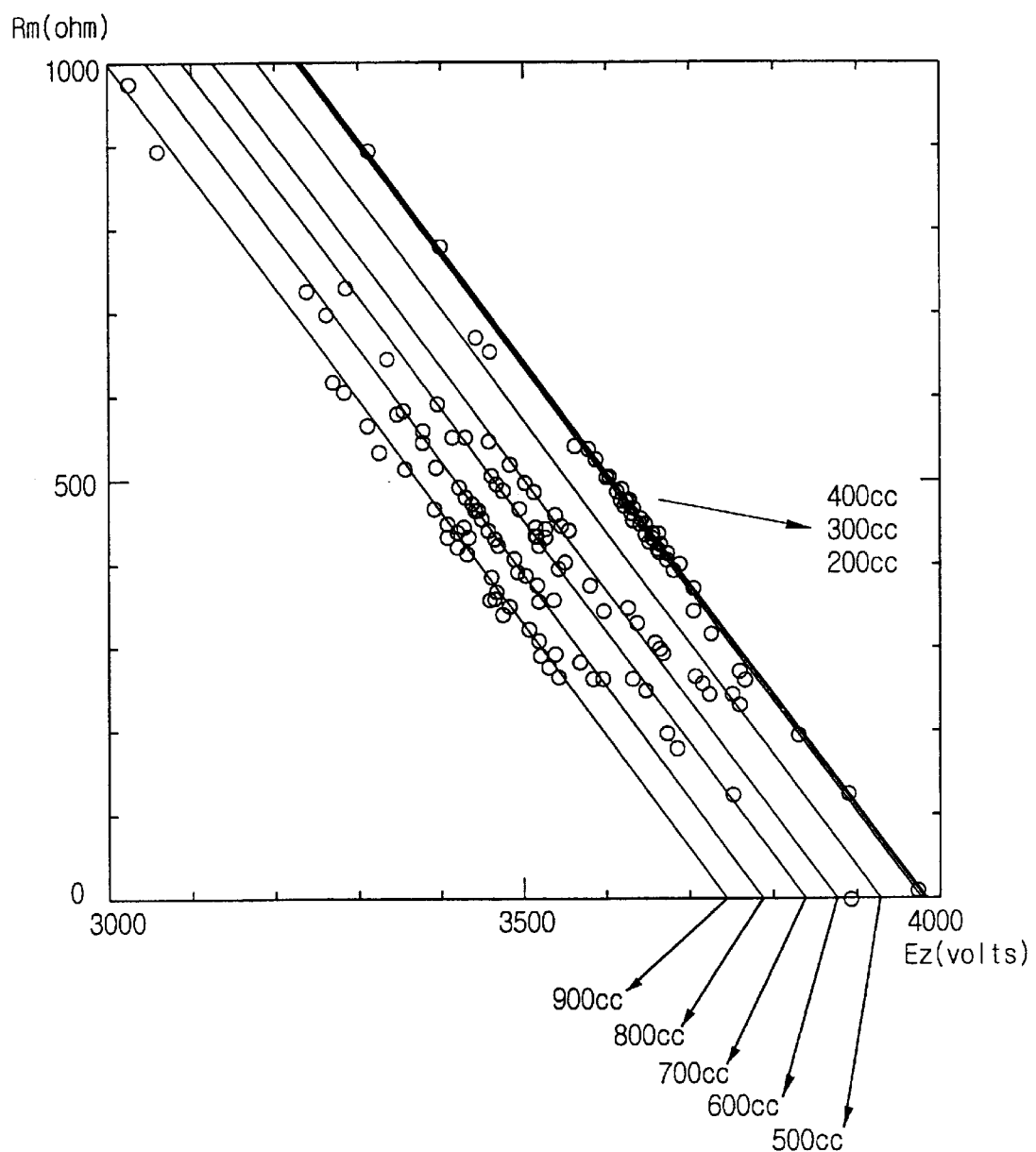
FIG. 12 is a graph for showing a distribution of the values of impedance and cutoff voltage, varying in accordance with the amount of the food.

FIG. 12 is a graph for showing a distribution of the values of impedance and cutoff voltage, varying in accordance with the amount of the food. Refer to FIG. 12, the amount of the food is distributed regularly along a line connecting the positions that the impedance Rm and the cutoff voltage Ez intersect. The data are pre-stored in the control section 240. The control section 240 compares the data with the detected impedance Rm and cutoff voltage Ez, and determines the amount of the food based on the comparison result.

Hereinbelow, the operation of microwave oven accordingly to another preferred embodiment of the present invention will be described in greater detail with respect to FIGS. 8 to 12.

First, the user places the food to be cooked in the cooking chamber, closes the door, and pushes the start key of the input section 250 to operate the microwave oven without setting the data about the amount of the food. The input section 250 inputs the signal from the selected keys to the control section 240, and the control section 240 detects such signals and drives the driving section 210, accordingly. The driving power is supplied to the high voltage transformer HVT in accordance with the operation of the driving section 210, and the high voltage transformer HVT transforms the supplied voltage to high voltage approximately of 2000V, and transmits the high voltage to the microwave generator 220. Then the high voltage condenser HVC and the high voltage diode HVD of the microwave generator 220 double the high voltage 2000V—which is transformed by the high voltage transformer HVT—to 4000V, approximately. The magnetron MGT is driven by such doubled high voltage to generate the microwave of 2,450 MHz. In such a situation, the output voltage Vap of the cathode of the magnetron MGT is inputted to the voltage dividing resistors R10 and R11 of the voltage detector 230, and divided based on the respective resistance ratios. The divided output voltage Vb is transmitted to the control section 240. Further, the output voltage Va is transmitted to the control section 240 from the step-down voltage resistor R12, which is connected to the ground of the high voltage transformer HVT. Then, the calculation part 242 of the control section 240 calculates the impedance Rm and the cutoff voltage Ez through the values of the respective resistors R10, R11, and R12, and the voltages Va, Vb, and Vc, which were detected by the voltage detector 230. Describing such a calculation process in greater detail, the output voltages Va and Vb are defined as the following equations (1) and (2) by Ohms law.

$Va=i_m=R12$ [Equation 1]

$Vb=(R11/(R11+R10))\times Vap$ [Equation 2]

Here, $i_m$ is the current induced in the secondary coil of the high voltage condenser HVC, R10, R11, and R12 are respective resistors, and Va, Vb, and Vap are output voltages respectively corresponding to the resistors. Meanwhile, the output voltage Vap is defined by the following equation (3) according to a voltage balance equation.

$Vap=Ez+i_m\times Rm$ [Equation 3]

Here, Vap and $i_m$ are the values of the Equations 1 and 2, Rm refers to the impedance, and Ez refers to the cutoff voltage. Accordingly, the following equation (4) is achieved by substituting Vap and $i_m$ defined by the equation (3) for the equations (1) and (2) and taking the derivative with respect to a time variable (t).

$Rm/R12\times(dVa/dt)=(R10+R11)/R11\times(dVb/dt)$ [Equation 4]

Then the impedance Rm and the cutoff voltage Ez are finally calculated by the following equations (5) and (6)

$Rm=R12(R10+R11)/R11\times\Delta Vb/\Delta Va$ [Equation 5]

$Ez=(R10+R11)/R11\times Vb-Rm/R12\times Va$ [Equation 6]

$Ez=(R12+R11)/R11\times Vb-Rm/R12\times Va$ [Equation 6]

Therefore, the calculation part 242 calculates the impedance Rm and the cutoff voltage Ez by substituting the output voltages Va, Vb, and Vap detected by the voltage detector 230, and the values of the resistors R10, R11, and R12 to the equations 5 and 6. Then, the comparison/determination part 241 compares/determines the calculated impedance Rm and the cutoff voltage Ez calculated by the calculation part 242 with the data about the impedance Rm and the cutoff voltage Ez which were pre-inputted thereto (see FIG. 11), and determines the amount of the food through the comparison result. More specifically, when the food of unidentified amount is placed in the cooking chamber, and when the impedance Rm and the cutoff voltage Ez are determined to be 300Ω and 3500V, respectively, it is determined that the amount of the food is 900 cc by the comparison/ determination part 241 based on the pre-stored data shown in FIG. 11. Accordingly, the amount of the food is determined, and the driving control part 243 controls the driving section 210 based on the amount of the food which was determined by the comparison/determination part 241. That is, the driving control part 243 selectively turns on/off the relay RY1 of the driving section 210 in accordance with the amount of the food for a predetermined time, so that the food is cooked under the appropriate conditions. Further, the display control part 244 controls the display section 260 in accordance with the amount of the food, which was determined by the comparison/determination part 241, so that the data about the amount of the food are displayed on the display section 260. Accordingly, the amount of the food can be automatically detected by the microwave oven, and the food can be cooked under the appropriate conditions for the amount thereof, so that the user finds it convenient using the microwave oven and the mistakes of the user in handling the microwave oven can be prevented. Further, using parts of reasonable prices, the manufacturing cost is reduced, and the manufacturing process is more simplified, so that productivity is improved.

Figure 13:
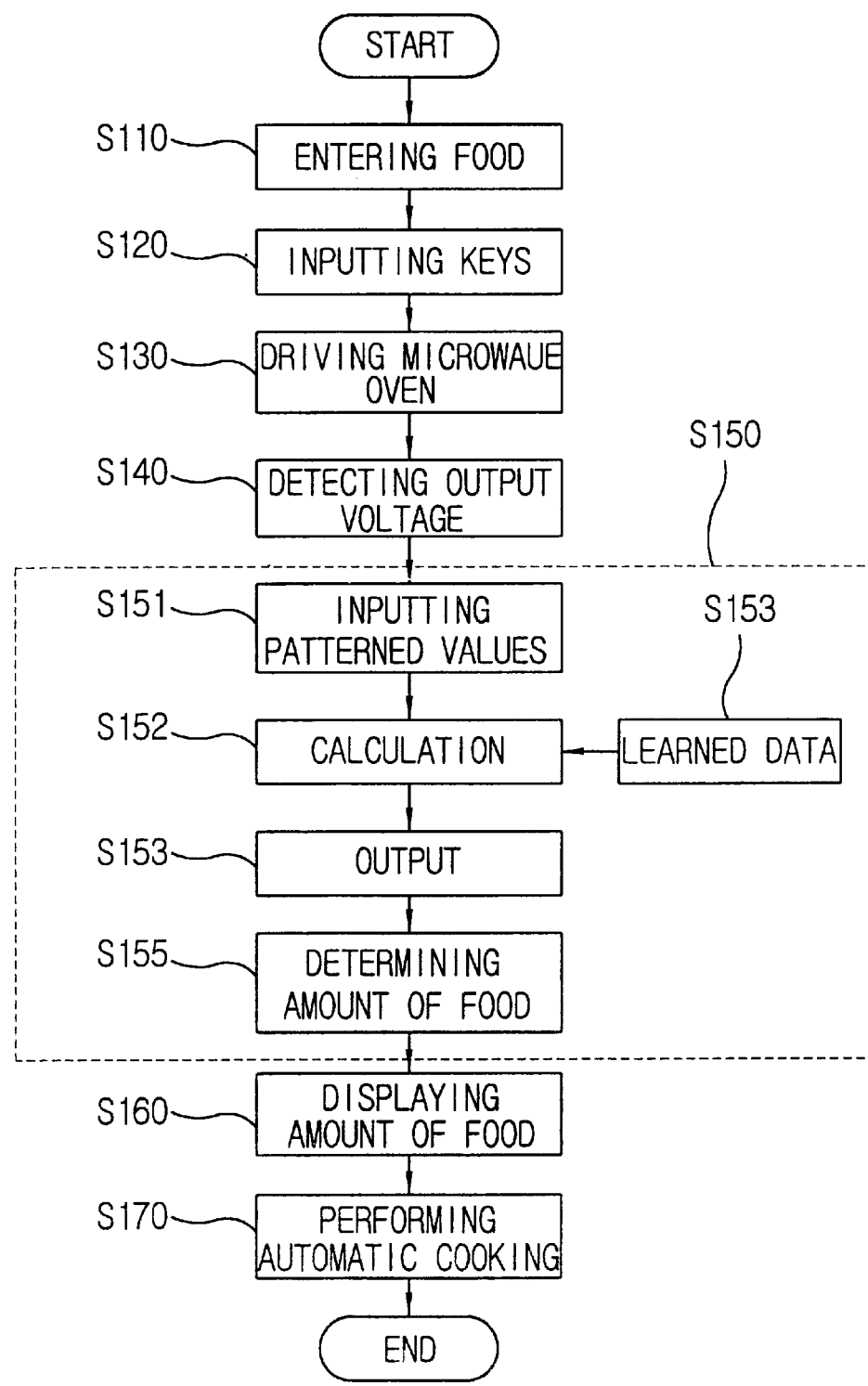
FIG. 13 is a flow chart for explaining a method for controlling the microwave oven according to the present invention.
Figure 14:
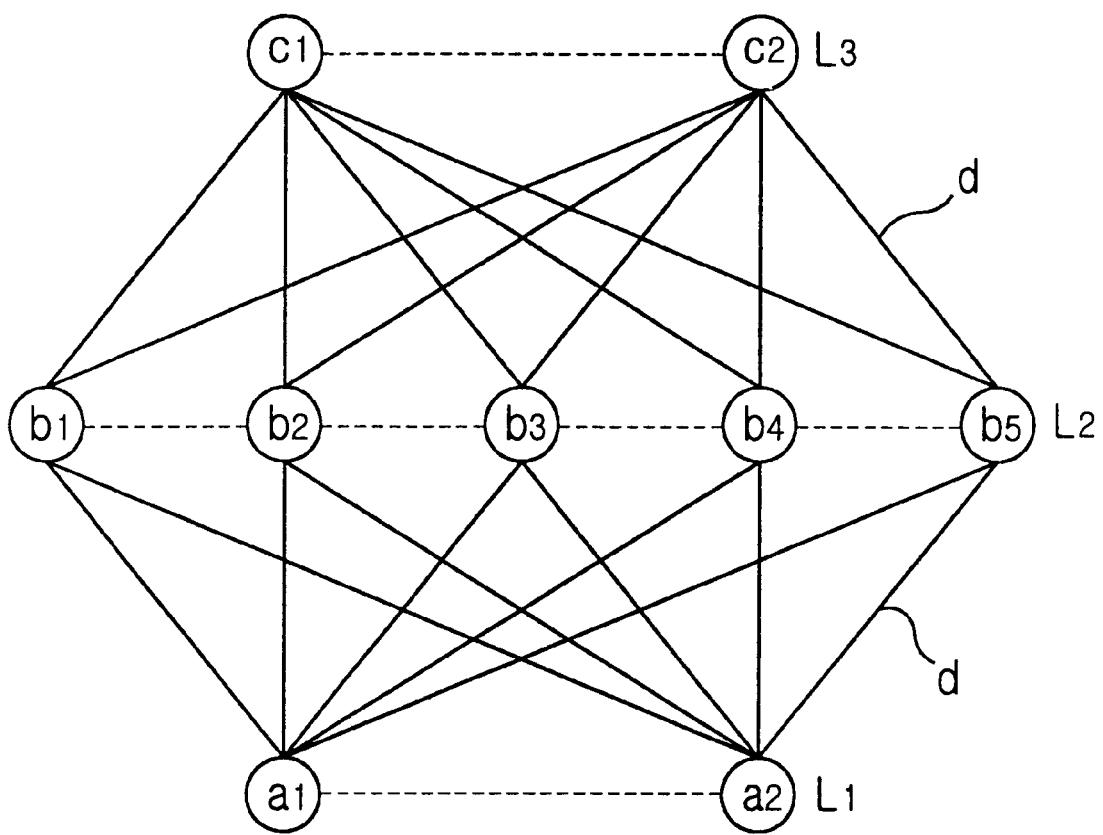
FIG. 14 is a diagram for illustrating the architecture of the Neural Network which is employed in FIG. 13.

FIG. 13 is a flow chart for explaining a method for controlling the microwave oven according to the present invention, and FIG. 14 is a diagram for illustrating the architecture of the Neural Network which is employed to FIG. 13.

Referring to FIGS. 13 and 14, the user places the food to be cooked in the cooking chamber, closes the door, and pushes the start key to operate the microwave oven, without setting the data about the amount of the food (Steps 110–130). Here, when the driving power is supplied to the high voltage transformer HVT, the high voltage transformer HVT transforms the driving power to high voltage approximately of 2000V. The high voltage is doubled to 4000V by the high voltage condenser HVC and the high voltage diode HVD.

The magnetron MGT is driven by the doubled high voltage 4000V, to generate the microwave of 2,450 MHz. In such a situation, the microwave oven performs an output voltage detecting step in which the output voltage of the magnetron MGT is detected (Step 140). Then, a step of determining the amount of the food is carried out (Step 150). In the Step 150, the output voltage detected from the magnetron MGT is inputted for a predetermined time, and the voltage variations per predetermined time unit are compared with the reference voltage variation which was pre-stored, so that the amount of the food is determined. The Step 150 comprises a Step 151 of converting the voltage variations per predetermined time units of the output voltage of Step 140 into the patterns having a predetermined law, and inputting the same to the Neural Net Program, and steps (Steps 151–154) of calculating equations from the Neural Net Program and outputting the results.

Then, the amount of the food in the cooking chamber is determined based on the outputted results (Step 155). Here, the Neural Net Program constitutes neurons which are fundamental functional units of nervous tissue of the human brain. The neurons are interconnected with each other to indicate the output resulting from the stimulus, and such a structure of the interconnected neurons is called a neural net. The Neural Net Program is the computer architecture which is constructed in a manner suggestive of such a neural net of the human brain. In the Neural Net Program, learning is repeatedly performed through the calculation of weights of the respective connective lines, and the basic law is found.

Here, as shown in FIG. 13, the Neural Net Program comprises an input layer L1, a hidden layer L2, and an output layer L3. Respective processors a1 and a2, b1 to b5, and c1 and c2 exist in the respective layers L1, L2, and L3. The processors are interconnected by a plurality of connective lines d which have the respective weights. Here, the processors a1 and a2, and the processors c1 and c2 of the input layer L1 and the output layer L3 are directly connected to the outer environment. While, the processors b to b5 of the hidden layer L2 between the input and the output layers L1 and L3 are indirectly connected to the outer environment. The connective topologies between the respective layers are in completely connected states, and the processors are not connected in lateral direction. Such a Neural Net Program is the completely connected net of multi-stages which does not permit regressive progress. Further, in the Step 150, it is also preferable that the impedance and the cutoff voltages of the magnetron MGT are calculated through a plurality of output voltages which were detected in the Step 140, and that the impedance and the cutoff voltage such calculated are compared with the pre-inputted data about the impedance and the cutoff voltage so that the amount of the food is determined through the comparison result. Accordingly, when the amount of the food is determined, the data about the amount of the food is displayed by the microwave oven, and the operation of the microwave generator is controlled in accordance with the amount of the food so that the food is cooked under the appropriate driving conditions, automatically (Steps 160–170). Since the amount of the food is automatically determined by the microwave oven, and since the food is cooked under the appropriate driving conditions for the amount thereof, the user finds it very convenient in using this microwave oven, and the mistakes of under-cooking/over-cooking the user makes in handling the microwave oven are prevented.

As described above, according to the food amount detector of this microwave oven, and the microwave oven employing the food amount detector and control method thereof, the user does not need to determine the amount of the food by himself or set the driving conditions of the microwave oven such as cooking time, cooking temperature, and level of microwave energy, or the like, but the user simply pushes the start key, by which the microwave oven automatically performs detection of the output voltage of the microwave generator, and determination of the amount of the food in accordance with the detected data. As a result, handling this microwave oven becomes much more convenient.

Further, since the food is cooked under the driving conditions of the microwave oven according to the amount thereof which is determined by this microwave oven, the food is cooked under the exact driving conditions.

Still further, since the microwave oven according to the present invention does not require additional devices for detecting the amount of the food such as a gas sensor, weight sensor, or the like, but simply requires the inexpensive parts such as resistors, etc. to determine the amount of the food, the manufacturing cost is reduced, and manufacturing processes are simplified. As a result, the productivity is improved.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A control method of a microwave oven comprising steps of:
   detecting output voltage of a magnetron;
   determining the amount of a food placed in a cooking chamber of a microwave oven based on an output voltage of the magnetron which is detected in the voltage detecting step; and
   cooking food properly by driving the magnetron in accordance with the amount of the food which is determined in the food amount determination step.

2. A method as claimed in claim 1, wherein the amount of the food is determined in the food amount determination step by receiving the output voltage of the magnetron detected in the output voltage detection step for a predetermined time, and by comparing the voltage variation per predetermined time unit with reference voltage variation which is pre-inputted.

3. A method as claimed in claim 2, wherein the food amount determination step comprises sub-steps of:
   inputting output voltage variation per predetermined time unit detected in the voltage detection step to a Neural Net Program after the voltage variation is converted into patterned values having a predetermined law therein;
   outputting results from the Neural Net Program after calculating equations of the Neural Net Program referring to pre-inputted patterned values and pre-learned data; and
   determining the amount of a food placed in a cooking chamber of a microwave oven based on the output result.

4. A method as claimed in claim 1, wherein the amount of a food is determined in the food amount determination step by receiving a plurality of output voltages which are detected in the voltage detection step, calculating values of impedance and cutoff voltage with the output voltages, and by comparing the values of impedance and cutoff voltage with data of the impedance and the cutoff voltage which are pre-inputted.

5. A method as claimed in claim 1, wherein the food amount determination step further comprises a sub-step of displaying the data about the amount of a food which are determined in the food amount determination step.

* * * * *